United States Patent
Robinson et al.

(10) Patent No.: US 9,465,697 B2
(45) Date of Patent: Oct. 11, 2016

(54) PROVISION OF BACKUP FUNCTIONALITIES IN CLOUD COMPUTING SYSTEMS

(75) Inventors: Matthew Douglas Robinson, Sunnyvale, CA (US); Keith J. Tenzer, Munich (DE)

(73) Assignee: NETAPP, INC., Sunnyvale, CA (US)

( * ) Notice: Subject to any disclaimer, the term of this patent is extended or adjusted under 35 U.S.C. 154(b) by 244 days.

(21) Appl. No.: 13/239,188

(22) Filed: Sep. 21, 2011

(65) Prior Publication Data

US 2014/0082167 A1 Mar. 20, 2014

(51) Int. Cl.
*G06F 11/14* (2006.01)

(52) U.S. Cl.
CPC ..... *G06F 11/1458* (2013.01); *G06F 2201/815* (2013.01)

(58) Field of Classification Search
CPC .................................... G06F 15/173
USPC ........................................ 709/223
See application file for complete search history.

(56) References Cited

U.S. PATENT DOCUMENTS

| | | |
|---|---|---|
| 7,366,742 B1 | 4/2008 | Umbehocker et al. |
| 8,195,153 B1 | 6/2012 | Frencel et al. |
| 2003/0217264 A1* | 11/2003 | Martin et al. ............... 713/156 |
| 2005/0044197 A1 | 2/2005 | Lai |
| 2005/0160118 A1 | 7/2005 | Berkowitz et al. |
| 2005/0260989 A1 | 11/2005 | Pourtier et al. |
| 2007/0112836 A1 | 5/2007 | Lanzatella et al. |
| 2007/0186068 A1 | 8/2007 | Agrawal |
| 2008/0133622 A1 | 6/2008 | Brown et al. |
| 2008/0172414 A1* | 7/2008 | Tien et al. ................. 707/104.1 |
| 2009/0112948 A1 | 4/2009 | Nguyen et al. |
| 2009/0240724 A1 | 9/2009 | Das et al. |
| 2009/0249005 A1 | 10/2009 | Bender et al. |
| 2010/0011178 A1* | 1/2010 | Feathergill ................... 711/162 |
| 2010/0057826 A1* | 3/2010 | Chow et al. ................. 709/201 |
| 2010/0070726 A1 | 3/2010 | Ngo et al. |
| 2010/0235493 A1* | 9/2010 | Besaw et al. ................ 709/224 |
| 2011/0246308 A1 | 10/2011 | Segall et al. |
| 2012/0198457 A1* | 8/2012 | Leonelli et al. ............. 718/102 |

OTHER PUBLICATIONS

Office Action mailed Apr. 2, 2012, for related U.S. Appl. No. 12/765,231, filed Apr. 22, 2010, 14 Pages.
Office Action mailed Nov. 8, 2012, for related U.S. Appl. No. 12/765,231, filed Apr. 22, 2010, 13 Pages.
Office Action mailed May 22, 2013, for related U.S. Appl. No. 12/765,231, filed Apr. 22, 2010, 12 Pages.

* cited by examiner

*Primary Examiner* — Anthony Mejia
*Assistant Examiner* — Joseph M Cousins
(74) *Attorney, Agent, or Firm* — Klein, O'Neill & Singh, LLP

(57) ABSTRACT

Exemplary embodiments provide various techniques for providing backup functionalities in a cloud computing system. In one exemplary method, a workflow that defines a set of actions associated with a backup functionality in a cloud computing system is accessed. A plug-in module that is configured to perform at least one of the set of actions associated with the backup functionality is identified from a number of plug-in modules. This identified plug-in module is then called to execute the action defined in the workflow.

17 Claims, 8 Drawing Sheets

500

1. QUIESCE DATABASE
2. QUIESCE VIRTUAL MACHINE
3. TAKE SNAPSHOT
4. UNQUIESCE VIRTUAL MACHINE
5. UNQUIESCE DATABASE

*FIG. 5*

PROVISION OF BACKUP FUNCTIONALITIES IN CLOUD COMPUTING SYSTEMS

FIELD

The present disclosure relates generally to data storage. In an exemplary embodiment, the disclosure relates to the provision of backup functionalities in cloud computing systems.

BACKGROUND

In general, cloud computing is a model for enabling on-demand network access to a shared pool of configurable computing resources. A cloud computing system is a complicated system with many interrelated levels of abstraction, such as a cloud service layer, a virtual center layer, and a storage layer. As a result, objects that reside in one layer are often dependent upon other objects in a different layer. For example, a virtual application, which resides in the cloud service layer, is a logical entity comprising a number of hypervisor-managed virtual machines that reside in a different virtual center layer.

There are many specialized data management systems that provide various data management functionalities, such as the automation of data backup and restoration of data, in a cloud computing system. However, many of these conventional data management systems are designed to back up objects without consideration of other interrelated objects. As an example, conventional data management systems can back up one or more hypervisor-managed virtual machines, but cannot back up the virtual applications associated with the hypervisor-managed virtual machines.

Given that many of these conventional data management systems do not account for the interrelations between objects in the cloud computing system, the data management systems cannot effectively prepare the various interrelated objects for data backup and restoration of data. As an example, a database may be hosted within a hypervisor-managed virtual machine, but conventional data management systems, when backing up the hypervisor-managed virtual machine, do not take this database into consideration. Accordingly, the database cannot be placed in a state that is ready for back up. Such an inability to prepare the interrelated objects for backup operations may result in backups of objects in inconsistent states, thereby not being able to provide an accurate backup of data in the cloud computing system.

Nonetheless, many of these conventional data management systems can be used to back up all objects and their attributes in a cloud computing system. However, a user must identify and manually define all the interrelated objects for backup in such a conventional data management system, but such a manual process can be labor intensive and requires the user to have extensive knowledge about the cloud computing system.

SUMMARY

Exemplary embodiments provide various techniques for providing backup functionalities in the cloud computing system. In particular, a user can orchestrate and automate the back up or restoration of data by defining a workflow. In one example, such a workflow can define a sequence of actions related to various backup functionalities. To execute the sequence of actions, an embodiment of the present invention automatically identifies and calls the appropriate plug-in modules that are configured to perform the actions.

This ability to define a workflow provides a user with the flexibility to integrate various actions taken on different, interrelated objects in a cloud computing system. As a result, a workflow can automatically define actions performed on various objects in a cloud computing system to prepare the objects to be backed up or restored. For example, before a backup of a hypervisor-managed virtual machine can be created, a database hosted on the hypervisor-managed virtual machine is quiesced to place the database in a state that is ready to accept the backing up of the data. Such a quiesce operation can include temporarily preventing access to the database. An example of a workflow can define actions to quiesce the database as part of the hypervisor-managed virtual machine backup process. A plug-in module that is configured to quiesce the database is automatically called to quiesce the database. After the database is quiesced using this selected plug-in module, the backing up of the hypervisor-managed virtual machine or other backup functionalities may then be initiated. The workflows can be stored and reused by, for example, a user without extensive knowledge of a cloud computing system to execute the backup functionalities defined in the various workflows.

BRIEF DESCRIPTION OF DRAWINGS

The present disclosure is illustrated by way of example and not limitation in the figures of the accompanying drawings, in which like references indicate similar elements and in which:

FIG. 5 depicts an example of a workflow that defines a set of actions associated with various backup functionalities;

DESCRIPTION OF EXEMPLARY EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail. Furthermore, the term "exemplary" is construed merely to mean an example of something or an exemplar and not necessarily a preferred or ideal means of accomplishing a goal.

Figure 1:
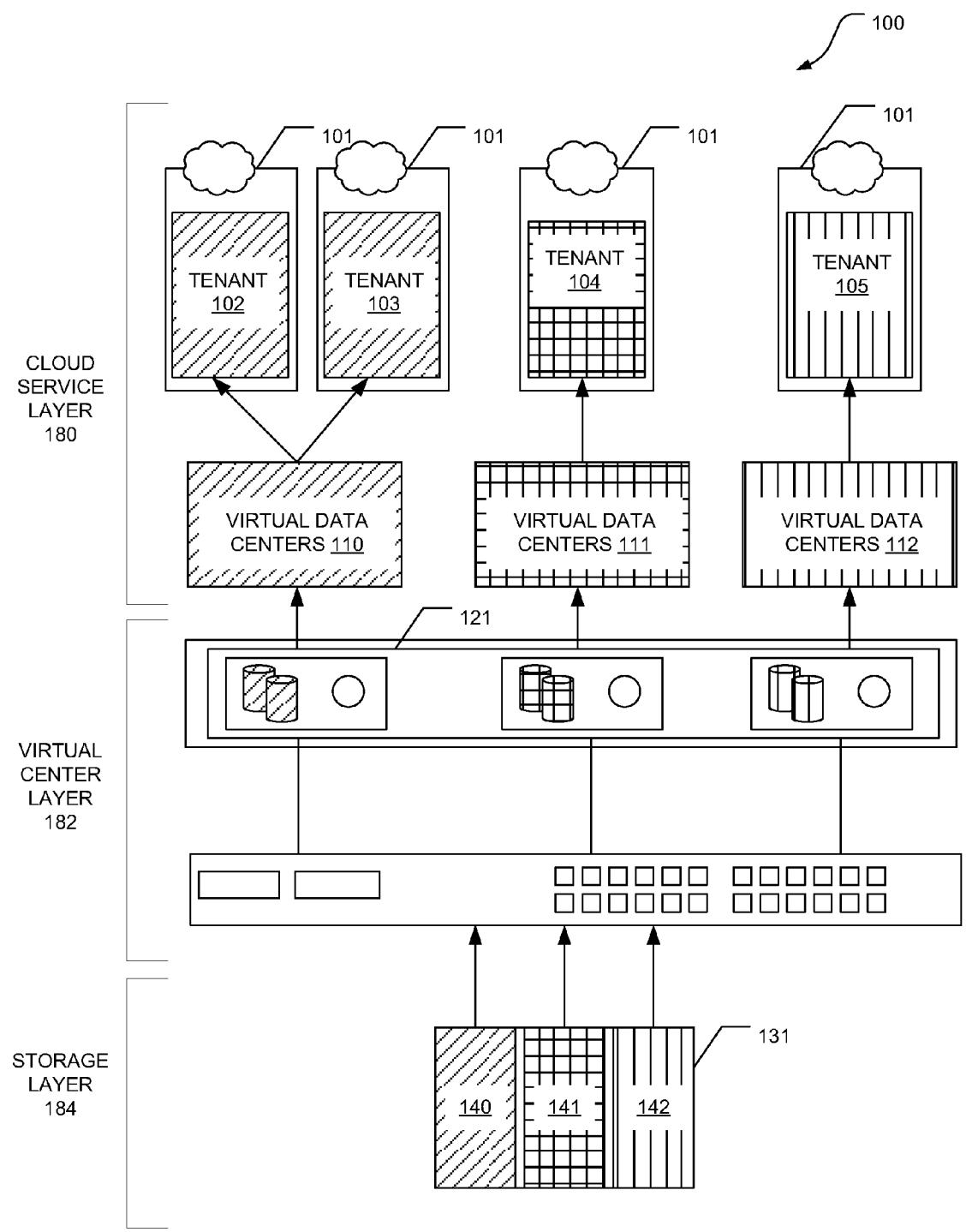
FIG. 1 is an architectural diagram of a high-level overview of an example of a cloud computing system.

FIG. 1 is an architectural diagram of a high-level overview of an example of a cloud computing system 100. Generally, cloud computing is a model for enabling on-demand network access to a shared pool of configurable computing resources (e.g., networks, servers, storage, applications, and services) that can be provisioned and released with minimal management effort or service provider interaction. An example of such a cloud computing system 100 is depicted in FIG. 1. In this example, the cloud computing system 100 can be divided into a cloud service layer 180, a virtual center layer 182, and a storage layer 184.

The cloud service layer 180 includes client computing devices 101 in communication with virtual data centers 110-112. The cloud service layer 180 is an abstraction layer on top of the virtual center layer 182 and, as explained in more detail below, abstracts the resources managed by the virtual center layer 182. This cloud service layer 180 provides support for multi-tenancy, which generally refers to a principle in software architecture where a single instance of a software runs on a server, serving multiple client tenants 102-105. As used herein, a "tenant" refers to a user having his own set of data that remains logically isolated from data that belongs to other tenants. Each tenant 102, 103, 104, or 105 has access to a self-service portal with its own virtual data center 110, 111, or 112. A virtual data center 110, 111, or 112 can be an abstract object that defines a logical group of virtual appliances, and depending on each tenant's requirement, each tenant 102, 103, 104, or 105 maps to a virtual data center 110, 111, or 112. In the cloud service layer 180 depicted in FIG. 1, tenant 104 maps to virtual data center 111, tenant 105 maps to virtual data center 112, and tenants 102 and 103 map to virtual data center 110.

The virtual center layer 182 provides the computing resources for the virtual data centers 110-112, where each virtual data center 110, 111, or 112 has a defined set of computing resources. The virtual center layer 182 provides a cloud operating system 121 that is able to manage large pools of virtualized computing infrastructure, including software and hardware. It should be noted that within the cloud operating system 121, computing resources are partitioned into virtual data center groups to provide resources to the virtual data centers 110-112. Such a separation of tenants and resources provide an additional level of security as well as independent scaling of tenants and management of resources.

The storage layer 184 provides storage resources for the virtual data centers 110-112. In one example, the storage layer 184 can include one or more network attached storage (NAS) devices 131 that support multi-tenancy architecture. When used within a NAS environment, the NAS devices 131 may be embodied as one or more file servers that are configured to operate according to a client/server model of information delivery to thereby allow multiple client computing devices (clients) 101 to access shared resources, such as files, stored on the file servers. The storage of information on a NAS environment can be deployed over a computer network that includes a geographically distributed collection on interconnected communication links, such as Ethernet, that allows client computing devices 101 to remotely access the information (e.g., files) on the file server. The client computing devices 101 can communicate with the file server by exchanging discrete frames or packets of data according to predefined protocols, such as Transmission Control/Internet Protocol (TCP/IP). These NAS devices 131 enable the creation of isolated logical partitions 140-142 on a single NAS device 131 such that no information on a secured virtual partition can be accessed by unauthorized tenants 102-105. In another example, the storage layer 184 can be deployed within a Storage Area Network (SAN) environment. A SAN is a high-speed network that enables establishment of direct connections between a storage system and its storage devices. The SAN may thus be viewed as an extension to a storage bus and, as such, an operating system of such a storage system enables access to stored data using block-based access protocols over an extended bus. In this context, the extended bus can be embodied as Fibre Channel, Computer System Interface (SCSI), Internet SCSI (iSCSI) or other network technologies.

Figure 2:
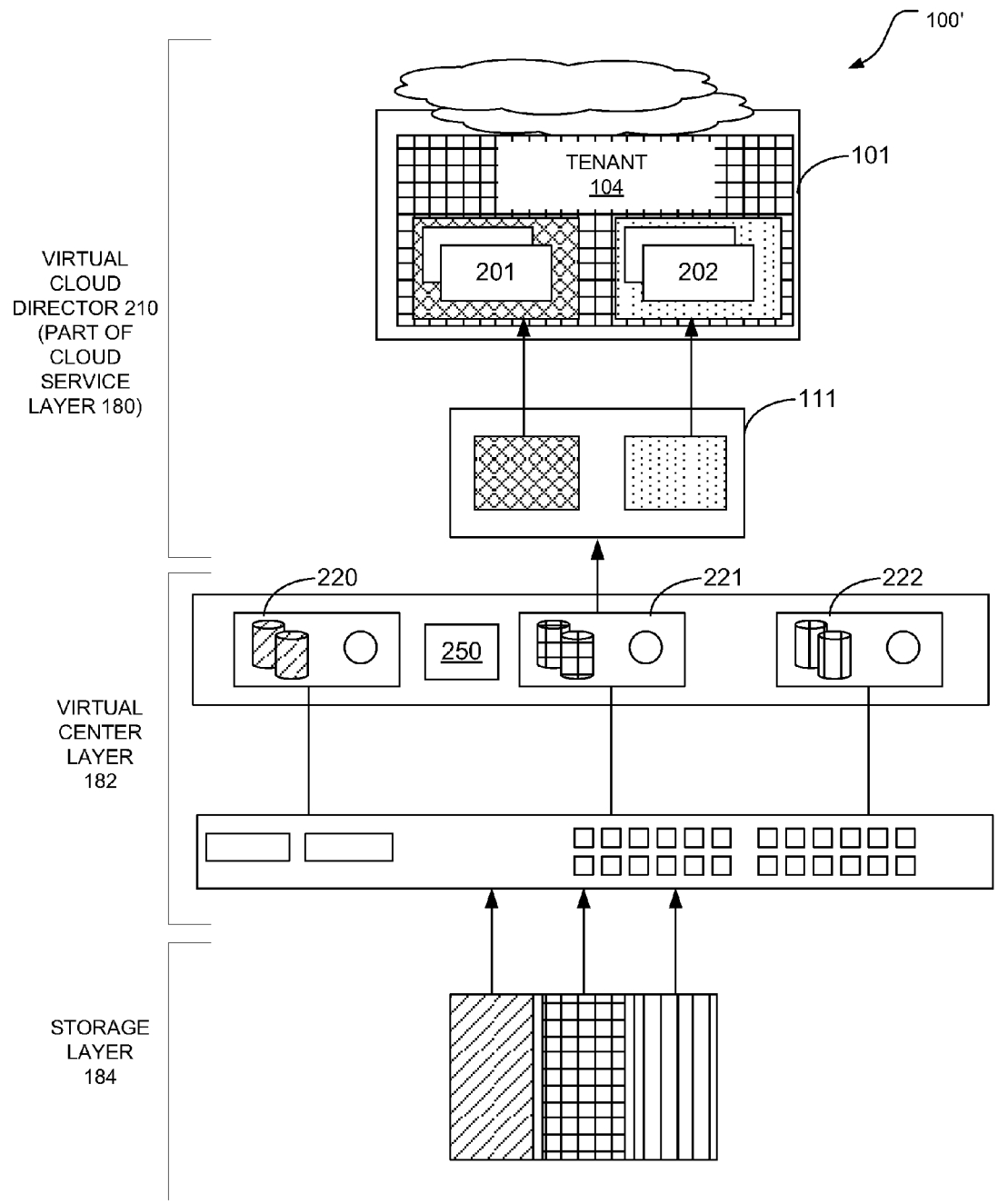
FIG. 2 is an architectural diagram of a more detailed overview of the example of the cloud computing system depicted in FIG. 1.

FIG. 2 is an architectural diagram of a more detailed overview of the example of the cloud computing system 100 depicted in FIG. 1. In reference to FIG. 2, the detailed cloud computing system 100' again can be divided into a cloud service layer 180, a virtual center layer 182, and a storage layer 184. However, in this embodiment, the cloud service layer 180 comprises a virtual cloud director 210. The virtual cloud director 210 abstracts resources that are managed in the virtual center layer 182. In general, the virtual cloud director 210 abstracts virtual center resources by providing different names and groupings. For example, a virtual data center 111 points to a virtual center server for resources and resource pools, and virtual applications 201 and 202 are deployed to virtual data centers (e.g., virtual data center 111), which are comprised of one or more hypervisor-managed virtual machines 220-222 on the virtual center server environment. In short, virtual cloud director 210 uses its own definition of objects, and those objects may have different names and associations at the virtual center layer 182. The virtual cloud director 210 combines these resources into large pools for consumption by tenant 104. Examples of resource types that can be pooled include computing clusters and resource pools, network digital-video switches and port groups, virtual machine file systems, and network file system shares. Additionally, the virtual cloud director 210 also adds a self-service portal.

Here, tenant 104 has access to a self-service portal with its own data center 111. This example of the cloud computing system 100' supports the creation of virtual applications 201 and 202. A "virtual application," as used herein, refers to a logical entity comprising a number of hypervisor-managed virtual machines 220-222 that encapsulate a component of a multitier application. In other words, a virtual application is a logical container for one or more hypervisor-managed virtual machines 220-222. It should be appreciated that a "virtual machine," as used herein, is a software emulation of a programmable machine, where the software implementation is constrained within another computer at a higher or lower level of symbolic abstraction. A "hypervisor" (or "virtual machine manager") refers to a program that allows multiple operating systems to share a single hardware host. The hypervisor provides operating systems a virtual operating platform and monitors the execution of the operating systems.

It should be noted that each virtual cloud director (e.g., virtual cloud director 210) can have one or more virtual data centers (e.g., virtual data center 111) per tenant (e.g., tenant 104), and the virtual applications 201 and 202 are included within the virtual data centers. As a result, a customer (e.g., tenant 104) can buy information technology space from a cloud provider, which manages the tenants (including tenant 104) through a single virtual cloud director 210 (or a cloud service layer). Each tenant (e.g., tenant 104) can have one or more virtual data centers (e.g., virtual data center 111) that run virtually in separate physical locations. These virtual data centers can run one or more virtual applications (e.g., virtual applications 201 and 202).

In the virtual center layer 182, one or more physical computing devices host the hypervisor-managed virtual machines 220-222. Alternatively, the virtual center layer 182 itself may be hosted on a hypervisor-managed virtual machine. Virtual applications 201 and 202 may allow multi-tier applications to be encapsulated using the open virtualization format (OVF) standard, which includes operational policies and service levels. Within a virtual application 201 or 202, a tenant 104 can, for example, set power-on sequencing options, control resource allocation, and provide additional customization as required by the application. A virtual application 201 or 202 also enables transfer of application between clouds.

In the embodiment depicted in FIG. 2, the virtual center layer 182 can host a backup integration engine module 250, which, as explained below, is configured to provide a variety of backup functionalities in the cloud computing system 100'. A "backup functionality," refers to any suitable functionality that results in or operates on a data backup, which refers to a copy of the data. An example of a backup functionality is a backing up of data. Another example of a backup functionality includes the restoration of a data backup. As used herein, a "backing up" of or "to back up" data generally refers to the process of creating a copy of the data (or a data backup). As explained in more detail below, the backup integration engine module 250 provides the backup functionalities based on a workflow. In an alternative embodiment, one or more of the virtual applications 201 and 202 can also host the backup integration engine module 250.

Figure 3:
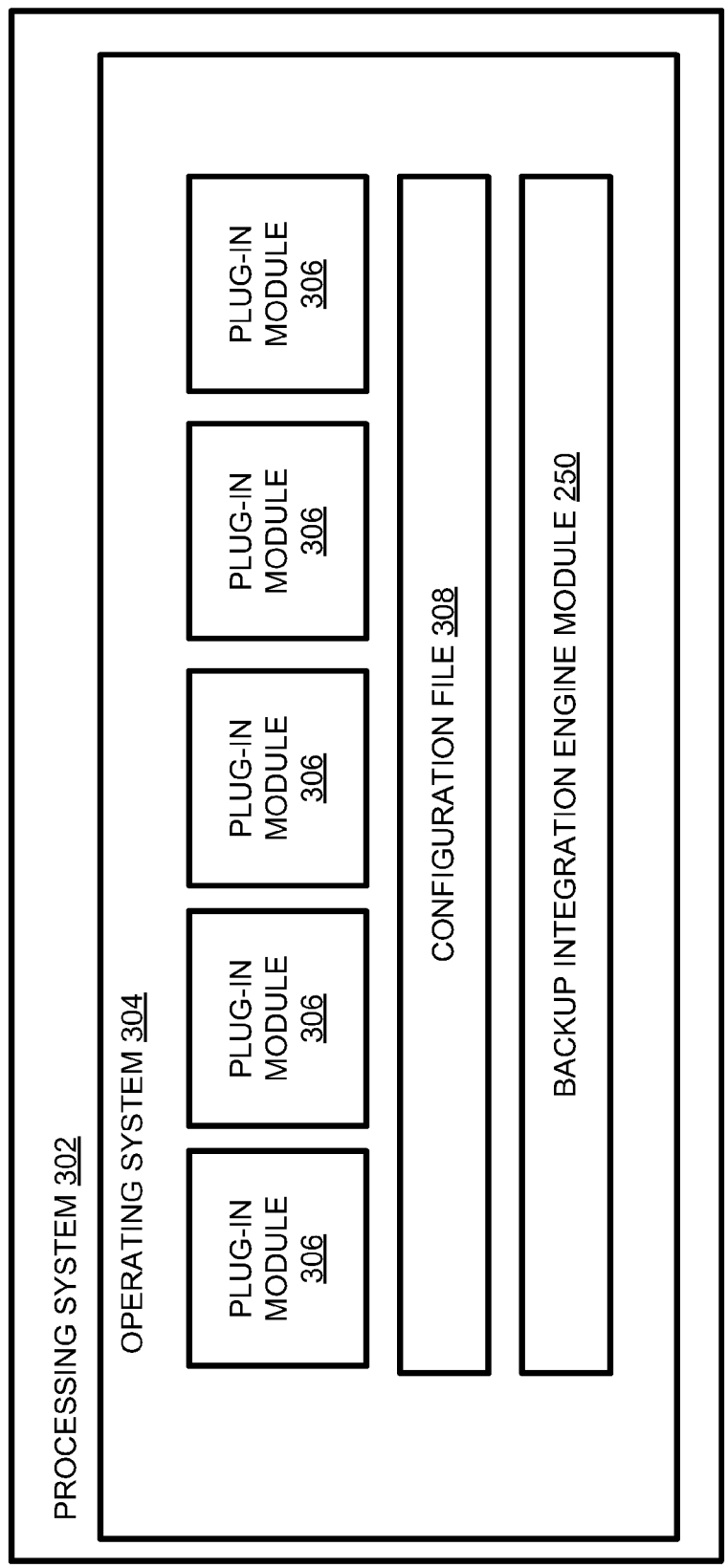
FIG. 3 depicts a block diagram of various modules that may be included in a processing system that provides various backup functionalities based on a workflow, in accordance with an embodiment of the present invention.

FIG. 3 depicts a block diagram of various modules that may be included in a processing system 302 that provides various backup functionalities based on a workflow, in accordance with an embodiment of the present invention. It should be appreciated that the processing system 302 may be deployed in the form of, for example, a network-attached storage device, a server computer, a personal computer, a laptop computer, and/or other processing systems. The processing system 302 may be included in a cloud computing system. For example, the processing system 302 may form a part of the virtual center layer 182 with the cloud computing system 100' depicted in FIG. 2. In various embodiments, the processing system 302 may be used to implement computer programs, logic, applications, methods, processes, or software to provide various backup functionalities, as described in more detail below.

In the embodiment depicted in FIG. 3, the processing system 302 executes an operating system 304, which manages various data, hardware resources, and software processes executed on the processing system 302. An example of the operating system 304 can be a network storage operating system that is specially optimized for storage functions, such as performing I/O commands and providing backup functionalities. Some processes and data being managed include plug-in modules 306, a backup integration engine module 250, and a configuration file 308.

Embodiments of the present invention provide frameworks that can call or execute different plug-in modules 306. A "plug-in module" refers to a program that interfaces with a host application (e.g., the backup integration engine module 250) to extend, modify, and/or enhance the capabilities or functionalities of the host application. The plug-in modules 306 effectively depend on the host application and may not function independently without the host application. The plug-in modules 306 can perform a variety of different actions. For example, one or more of the plug-in modules 306 can include scripts that perform a quiesce operation. As used herein, a "quiesce" operation is to place an application in a state ready to accept a backup functionality. In particular, an application is quiesced when it is placed in a special mode that allows the backup functionality to be implemented. It should be appreciated that the state for one application may be different for another application. As a result, quiescing an application may be unique to each application. Accordingly, there is a variety of different techniques to quiesce an application. In one example of quiescing a database management system, a connection is first made to the database management system. Thereafter, the database management system may be instructed to place all its database tables, which store the data, into read-only mode where data can be read but not written to the database tables. This placement of the database tables in read-only mode may, for example, prevent data corruption during a backup process. Other examples of quiesce operations include preventing users from connecting to an application, locking all users out of a database table or other structured data, disallowing new resources from being made available, preventing modification of data, disabling the application itself (e.g., shutdown application and place application in sleep mode), allowing current active transactions to complete and then flushing modified buffers from cache to another database table, reinitiating or restarting an application, modifying a file system, and other quiesce operations.

In another example, one or more plug-in modules 306 can include scripts that perform an unquiesce operation. As used herein, an "unquiesce" operation refers to the reversion of a state of an application to a previous state before quiescing the application. As an example, such a previous state may refer to an application's normal mode or state of operation.

In other examples, one or more plug-in modules 306 can include scripts that perform a backup operation and/or a restore operation. Examples of such backup operations include taking a snapshot of data, cloning data, and mirroring of data. A snapshot is an instant copy within a file system. Such a snapshot can practically, for example, copy large amounts of data in a few seconds. More particularly, a snapshot is a space conservative, point-in-time, and read-only image of data accessible by name that provides a consistent image of that data (such as a storage system) at some previous time. A snapshot is a point-in-time representation of a storage element, such as an active file system, file or database, stored on a persistent storage device and having a name or other identifier that distinguishes it from other snapshots taken at other points in time. In a write-anywhere file system, a snapshot is an active file system image that contains complete information about the file system, including all suitable metadata.

A clone is a modifiable copy created from a snapshot. It should be appreciated that since the modifiable copy is created from a snapshot, the modifiable copy may therefore be a near-instantaneous, space efficient, and, in an example embodiment, a writable "clone" of the snapshot, which shares the same physical blocks with the baseline file system. When the snapshot and the modifiable copy diverge (e.g., due to continuing updates in the production database or development changes to a modifiable copy of the database), the divergent blocks are separately stored. Since the creation of a modifiable copy from a snapshot is near instantaneous, such replication technique may result in minimal downtime of the accessibility of the data.

A mirror is an exact copy of a data set. Here, the data is mirrored onto the secondary storage system to ensure, for example, that the primary copy is kept up-to-date with the data. Mirroring can be synchronous, where, for example, a block of the data written to the primary storage system is also immediately transmitted to the secondary storage system. In asynchronous mirroring, the block of data written to the primary storage system is transmitted to the secondary storage system at a later time.

Still referring to FIG. 3, in one exemplary embodiment, the operating system 304 includes a configuration file 308 that includes one or more workflows that, as explained in more detail below, define actions to be taken related to backup functionalities. The backup integration engine module 250 is adapted to interface with all plug-in modules 306 and further adapted to call, load, or execute selected plug-in modules 306 based on actions defined within the workflow.

It should be appreciated that in other embodiments, the operating system 304 may include fewer or more modules apart from those shown in FIG. 3. For example, in an alternate embodiment, configuration file 308 may be stored elsewhere in a different processing system 302. In FIG. 3, the modules 250 and 306 are in the form of software that is processed by a processor. However, as explained in more detail below, the modules 250 and 306 may also be in the form of firmware that is processed by application specific integrated circuits (ASIC), which may be integrated into a circuit board. Alternatively, the modules 250 and 306 may be in the form of one or more logic blocks included in a programmable logic device (for example, a field programmable gate array). The described modules 250 and 306 may be adapted, and/or additional structures may be provided, to provide alternative or additional functionalities beyond those specifically discussed in reference to FIG. 3. Examples of such alternative or additional functionalities will be discussed in reference to the flow diagrams discussed below.

Figure 4:
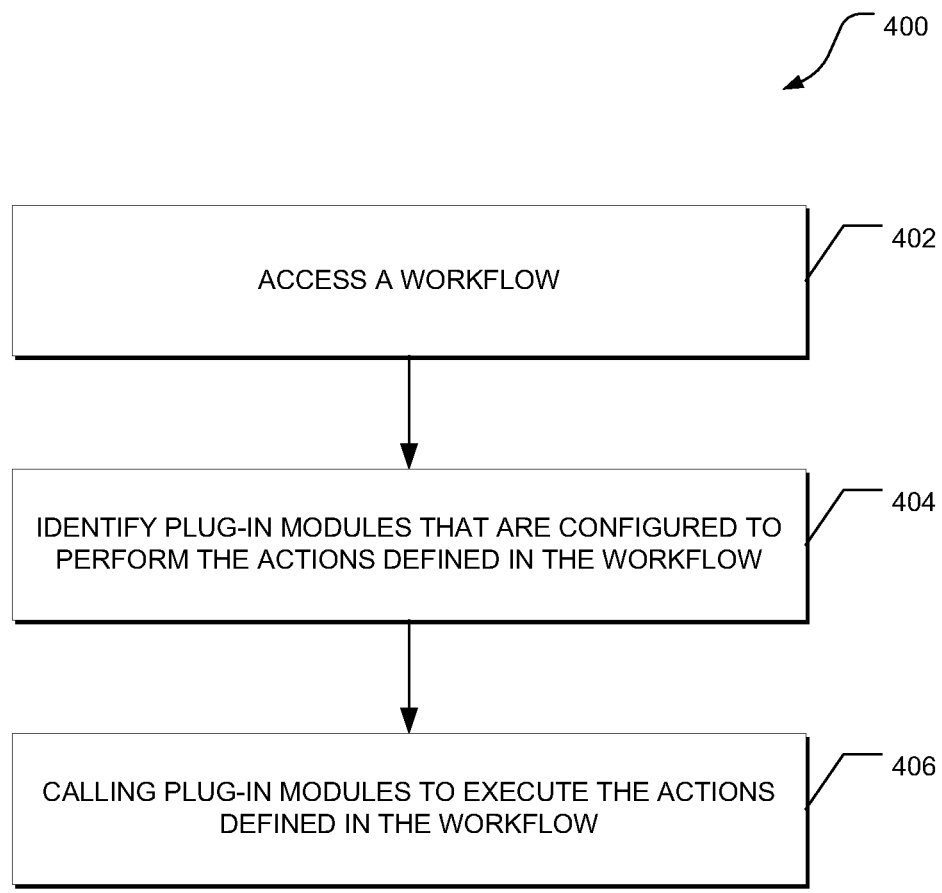
FIG. 4 depicts a flow diagram of a general overview of a method, in accordance with an embodiment, for providing backup functionalities in a cloud computing system.

FIG. 4 depicts a flow diagram of a general overview of a method 400, in accordance with an embodiment, for providing backup functionalities in a cloud computing system. In some exemplary embodiments, the method 400 may be implemented by the backup integration engine module 250 of FIG. 3 and employed in, for example, the virtual center layer 182 of FIG. 2. As depicted in FIG. 4, the backup integration engine module 250 initially accesses a workflow at 402. As used herein, a "workflow" refers to a scheduling of actions related to backup functionalities. In particular, the workflow defines a set of actions or instructions associated with backup functionalities in the cloud computing system. In one embodiment, an action defined in the workflow can be an operation on an object in a cloud computing system. An "object," as used herein, refers to an entity that can be manipulated by the commands of a programming language, such as a value, variable, function, or data structure. In a cloud computing system, examples of objects include virtual applications and hypervisor-managed virtual machines. Furthermore, the workflow can also define a scheduling or order of each action relative to other actions. A workflow may be defined in a file, such as the configuration file discussed above in FIG. 3.

With the workflow accessed, the backup integration module identifies plug-in modules at 404 that are configured to perform the actions defined in the workflow. As an example, a workflow may define a quiesce operation for a certain database, and the backup integration module having access to the workflow identifies a particular plug-in module that is configured to perform the quiesce operation. In another example, the workflow may define a snapshot operation, and the backup integration module identifies a particular plug-in module that is configured to perform this snapshot operation.

After the plug-in modules are identified, the backup integration module, at 406, calls the identified plug-in modules to execute the actions defined in the workflow. As explained in more detail below, each plug-in module can be executed based on a scheduling defined in the workflow.

FIG. 5 depicts an example of a workflow that defines a set of actions associated with various backup functionalities. In this example, the workflow 500 defines a set of actions in the form of scripts. As used herein, a "script" refers to a program with one or more instructions, commands, parameters, and/ or other data that control one or more applications. A script may, for example, refer to a single command, a single instruction, a set of commands, or a set of instructions. The script may be user-defined.

In the exemplary workflow 500, the set of actions include scripts for quiescing a database, quiescing a hypervisor-managed virtual machine, taking a snapshot, unquiescing the hypervisor-managed virtual machine, and unquiescing the database. Each of these actions are defined in sequence having numbers 1, 2, 3, 4, and 5, where these numbers define a sequence for executing the actions. In this example, the actions are executed in increasing sequential order. For example, the quiesce database action, which is ranked number 1 in the workflow 500, is executed before the quiesce hypervisor-managed virtual machine action, which is ranked number 2. The take snapshot action, which is ranked number 3, is executed after the quiesce hypervisor-managed virtual machine action because number 3 is ranked after number 2.

Figure 6:
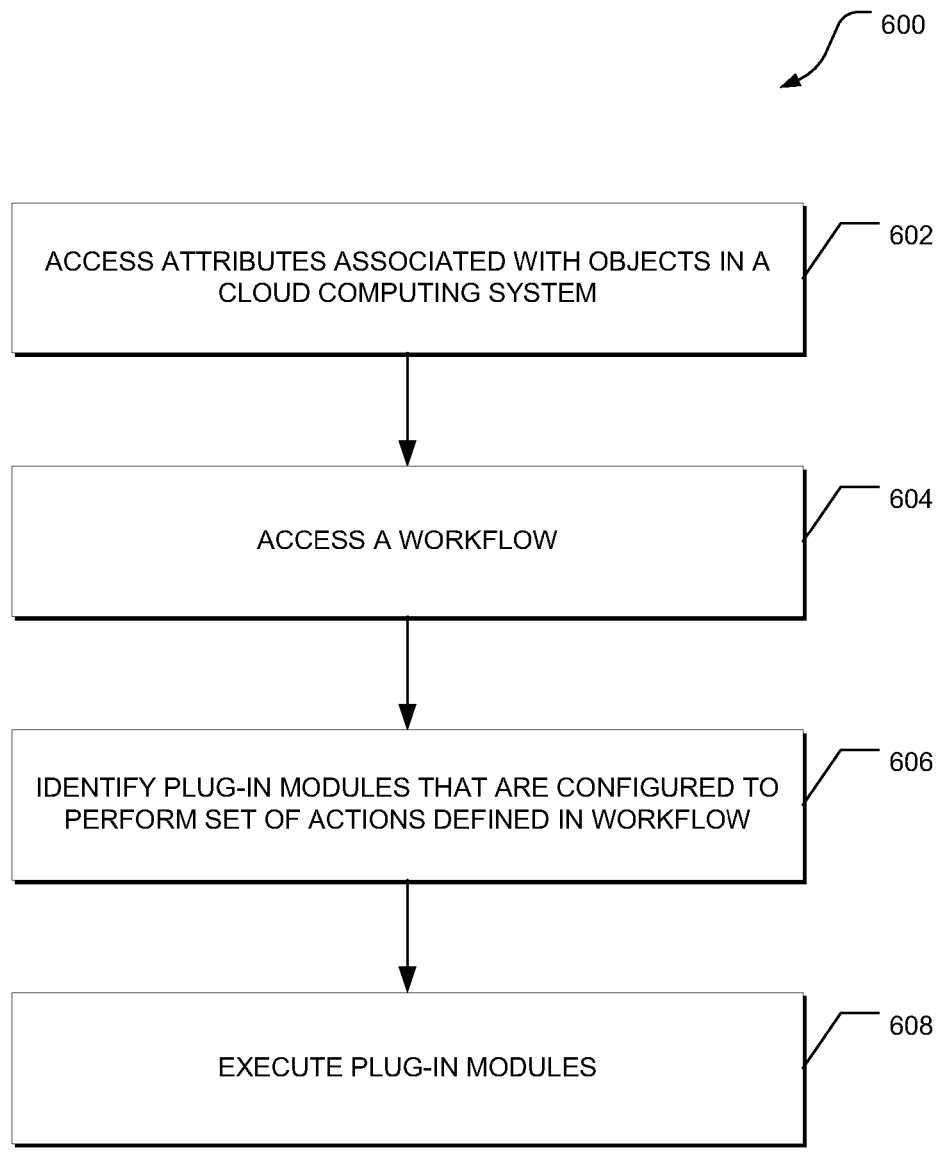
FIG. 6 depicts a flow diagram of a more detailed overview of a method, in accordance with an embodiment, for providing backup functionalities in a cloud computing system.

FIG. 6 depicts a flow diagram of a more detailed overview of a method 600, in accordance with an embodiment, for providing backup functionalities in a cloud computing system. In some exemplary embodiments, the method 600 may be implemented by the backup integration engine module 250 of FIG. 3 and employed in, for example, the virtual center layer 182 of FIG. 2. As depicted in FIG. 6 at 602, the backup integration module accesses attributes associated with objects in the cloud computing system. As used herein, an "attribute" refers to a property or feature associated with an object in, for example, a cloud computing system. For example, an attribute can refer to a property or feature associated with a virtual application or a virtual application object. Another example of such an attribute includes an identifier used by the virtual application object to identify a hypervisor-managed virtual machine object. In yet another example, an attribute can be a property or feature associated with a hypervisor-managed virtual machine object. An example of such an attribute is a name used by a virtual center to identify a hypervisor-managed virtual machine object. Yet another example of an attribute includes a pointer used by a virtual center to identify the hypervisor-managed virtual machine object.

Additionally, the backup integration module, at 604, accesses a workflow. In one embodiment, this workflow defines a set of actions that are associated with the back up of the accessed attributes. It should be noted that the back up of objects in a cloud computing system involves identifying and backing up the objects' attributes. In one embodiment, these attributes may be accessed from the workflow. That is, in addition to actions, the workflow can also define attributes associated with objects in a cloud computing system. A user can manually define these attributes in the workflow. In an alternate embodiment, the attributes may be accessed or identified from the cloud computing system itself. For example, to obtain or identify attributes associated with a virtual application, a cloud service layer in the cloud computing system can be queried for a listing of virtual applications. In response to the query, an attribute associated with the virtual application is received from the cloud service layer. An example of such an attribute includes a listing of hypervisor-managed virtual machines that are associated with the particular virtual application. In particular, this listing may include identifiers used by the virtual applications to identify each of the hypervisor-managed virtual machines.

Thereafter, the backup integration module identifies, at 606, a number of plug-in modules that are configured to perform the set of actions. In one example, the backup integration module can store a listing of all plug-in modules that are interfaced with the backup integration module. The listing may include, for example, names of the plug-in modules, plug-in types, and related items (e.g., other plug-in modules). From this listing, the backup integration module can identify the number of plug-in modules that can perform the set of defined actions. At 608, with the plug-in modules identified, the backup integration module then executes the identified plug-in modules to perform the set of actions defined in the workflow.

Figure 7:
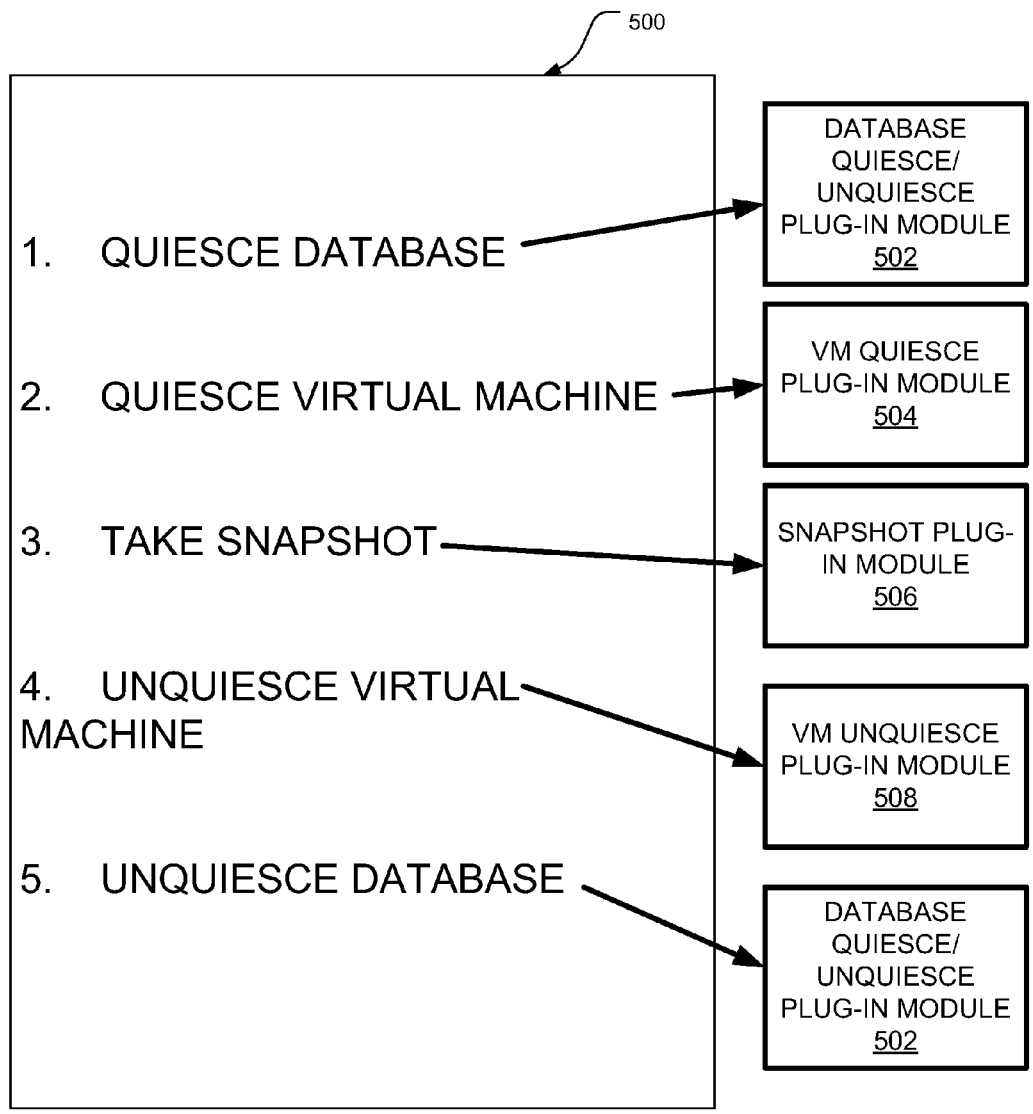
FIG. 7 depicts a block diagram illustrating an identification of plug-in modules that are configured to perform various actions defined in the workflow, in accordance with an exemplary embodiment of the present invention.

FIG. 7 depicts a block diagram illustrating an identification of plug-in modules that are configured to perform various actions defined in the workflow, in accordance with an exemplary embodiment of the present invention. The exemplary workflow 500 depicted in FIG. 7 is the same workflow 500 described above in FIG. 5. As previously explained, the workflow 500 defines a set of actions in the form of scripts. In particular, the set of actions include (1) quiescing a database, (2) quiescing a virtual machine, (3) taking a snapshot, (4) unquiescing the virtual machine, and (5) unquiescing the database. The numbers (1)-(5) define a sequence for executing the actions.

As depicted, the backup integration engine module (not shown in FIG. 7) initially accesses the workflow 500 and reads the set of actions (1)-(5) defined in the workflow 500. The first action scheduled is quiesce database, and the backup integration engine module identifies and calls a database quiesce/unquiesce plug-in module 502 that is configured to perform the first action. Thereafter, the second action scheduled is quiesce hypervisor-managed virtual machine, and the backup integration module identifies and calls a virtual machine quiesce plug-in module 504 that is configured to perform the second action. The third action scheduled is take snapshot, and the backup integration module identifies and calls a snapshot plug-in module 506 that is configured to perform this third action. The fourth action scheduled is unquiesce hypervisor-managed virtual machine, and the backup integration module identifies and calls a virtual machine unquiesce plug-in module 508 that is configured to perform this fourth action. Finally, the fifth action scheduled is unquiesce database, and the backup integration module identifies and calls the same database quiesce/unquiesce plug-in module 502 that is configured to perform the fifth action.

This ability to define the workflow 500 provides a user with the flexibility to integrate various actions taken on different, interrelated objects in a cloud computing system. As a result, the workflow 500 can define actions performed on various objects in a cloud computing system to, for example, prepare the objects to be backed up or restored. For example, as defined in the workflow 500, before a backup (or snapshot) of a hypervisor-managed virtual machine can be created, a database hosted on the hypervisor-managed virtual machine is quiesced to place the database in a state that is ready to accept the backing up of the data. Such a quiesce operation can include temporarily preventing access to the database. Additionally, the hypervisor-managed virtual machine is also quiesced before the back up.

Figure 8:
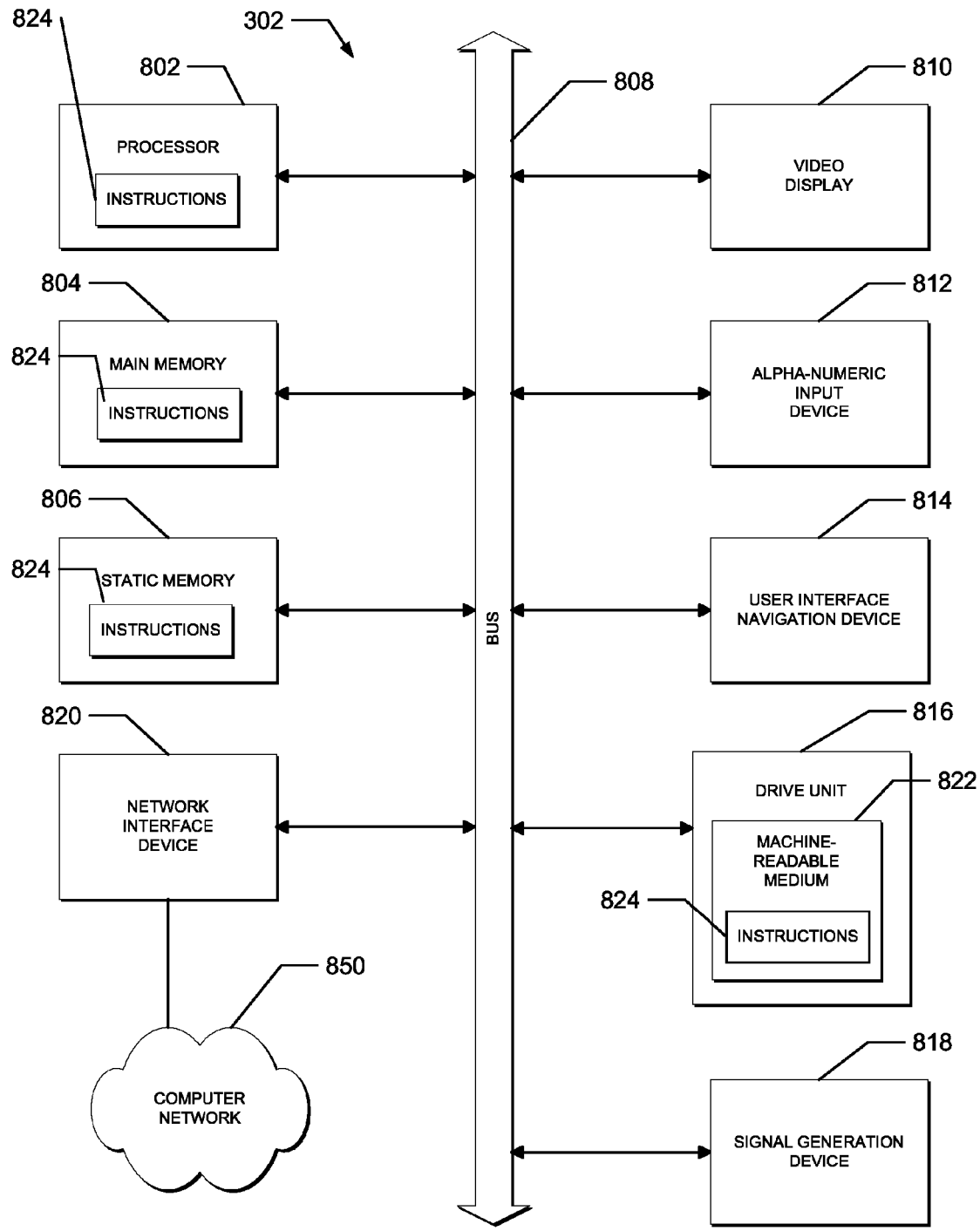
FIG. 8 depicts a hardware block diagram of a machine in the example form of a processing system within which may be executed a set of instructions for causing the machine to perform any one or more of the methodologies discussed herein.

FIG. 8 depicts a hardware block diagram of a machine in the example form of a processing system 302 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or as a peer machine in a peer-to-peer (or distributed) network system.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 302 includes a processor 802 (e.g., a central processing unit (CPU), a graphics processing unit (GPU) or both), a main memory 04 (e.g., random access memory), and static memory 806 (e.g., static random-access memory), which communicate with each other via bus 808. The processing system 302 may further include video display unit 810 (e.g., a plasma display, a liquid crystal display (LCD) or a cathode ray tube (CRT)). The processing system 302 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by processing system 302, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute software modules (e.g., code embodied on a machine-readable medium or in a transmission signal) and/or hardware modules. A hardware module is a tangible unit capable of performing certain operations and may be configured or arranged in a certain manner. In exemplary embodiments, one or more computer systems (e.g., the processing system 302) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some exemplary embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some exemplary embodiments, the processors 802 may be located in a single location (e.g., within a home system, an office system or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques providing functionalities in a cloud computing system may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment (s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of providing backup functionality for backing up and restoring data stored in a cloud computing system, the method comprising:

identifying, using a backup application, a plurality of virtual machines of a virtual application in the cloud computing system, where the virtual application is a logical container for the plurality of virtual machines;

wherein the cloud computing system comprises a cloud service layer for providing storage access to a user, a virtual center layer that hosts the backup application and provides computing resources for a plurality of virtual data centers accessible via the cloud service layer, and a storage layer providing storage resources for the plurality of virtual data centers;

wherein the virtual application is accessible via one of the virtual data centers of the cloud service layer; and wherein the backup application interfaces with a plurality of plug-in modules to provide backup functionality for the plurality of virtual machines of the virtual application, where each plug-in module performs an operation to place an application of any of the virtual machines in a state to accept backup functionality, where the state of the application is specific to an application type;

accessing, using the backup application, a workflow that defines a plurality of actions for performing a backup functionality for each of the plurality of virtual machines of the virtual application, where each action of the plurality of actions corresponding to the backup functionality is performed by a corresponding plug-in module; and for each action of the plurality of actions identified from the workflow:
(i) accessing a list of a plurality of plug-in modules by the backup application, each of the plurality of plug-in modules comprising a program associated with the backup application, the association being made before runtime of the backup application, and requiring an interface with the backup application to function and provide additional functionality to the backup application, (ii) selecting a plug-in module from the list that is designed to perform the action on a given virtual machine of the virtual application, and (iii) executing the selected plug-in module to perform that action on the given virtual machine, the selected plug-in module being executed by the backup application;

wherein one of the plurality of plug-in modules performs one or more unique quiesce operations for placing an application in a state for enabling the backup functionality, the state varies from one application to another application; and wherein one of the plurality of plug-in modules performs one or more unique unquiesce operations after the quiesce operation that places the application to a state before the quiesce operation.

2. The method of claim 1, wherein the workflow defines a scheduling of each action relative to each other action in the plurality of actions.

3. The method of claim 2, wherein (ii) selecting the plug-in module and (iii) executing the selected plug-in module are automatically performed in sequence for each action of the plurality of actions, the sequence being defined based on the scheduling defined in the workflow.

4. The method of claim 1, wherein one of the plurality of plug-in modules performs a backup operation.

5. The method of claim 1, wherein one of the plurality of plug-in modules performs a restore operation.

6. A processing system deployed in a virtual center layer of a cloud computing system, the processing system comprising:

at least one processor; and a non-transitory, machine-readable medium in communication with the at least one processor, the non-transitory, machine readable medium storing instructions that, when executed by the at least one processor, cause the at least one processor to perform operations comprising:

identifying, using a backup application, a plurality of virtual machines of a virtual application in the cloud computing system, where the virtual application is a logical container for the plurality of virtual machines;

wherein the cloud computing system comprises a cloud service layer for providing storage access to a user, the virtual center layer that hosts the backup application and provides computing resources for a plurality of virtual data centers accessible via the cloud service layer, and a storage layer providing storage resources for the plurality of virtual data centers;

wherein the virtual application is accessible via one of the virtual data centers of the cloud service layer; and wherein the backup application interfaces with a plurality of plug-in modules to provide backup functionality for the plurality of virtual machines of the virtual application, where each plug-in module performs an operation to place an application of any of the virtual machines in a state to accept backup functionality, where the state of the application is specific to an application type;

accessing, using the backup application, a workflow that defines a plurality of actions for performing a backup functionality for each of the plurality of virtual machines of the virtual application, where each action of the plurality of actions corresponding to the backup functionality is performed by a corresponding plug-in module; and for each action of the plurality of actions identified from the workflow:

(i) accessing a list of a plurality of plug-in modules by the backup application, each of the plurality of plug-in modules comprising a program associated with the backup application, the association being made before runtime of the backup application, and requiring an interface with the backup application to function and provide additional functionality to the backup application, (ii) selecting a plug-in module from the list that is designed to perform the action on a given virtual machine of the virtual application, and (iii) executing the selected plug-in module to perform that action on the given virtual machine, the selected plug-in module being executed by the backup application, wherein one of the plurality of plug-in modules performs one or more unique quiesce operations for placing an application in a state for enabling the backup functionality, the state varies from one application to another application; and wherein one of the plurality of plug-in modules performs one or more unique unquiesce operations after the quiesce operation that places the application to a state before the quiesce operation.

7. The processing system of claim 6, wherein the non-transitory, machine-readable medium additionally stores a configuration file, and wherein the workflow is stored in the configuration file.

8. The processing system of claim 6, wherein the workflow defines a scheduling of each action relative to each other action in the plurality of actions.

9. The processing system of claim 8, wherein the instructions cause the processor to (ii) select the plug-in module and (iii) execute the selected plug-in module automatically in sequence for each action of the plurality of actions, the sequence being defined based on the scheduling defined in the workflow.

10. A non-transitory, machine-readable medium storing instructions that, when performed by a machine at a virtual center layer of a cloud computing system, cause the machine to perform operations comprising:

identifying, using a backup application, a plurality of virtual machines of a virtual application in the cloud computing system, where the virtual application is a logical container for the plurality of virtual machines;

wherein the cloud computing system comprises a cloud service layer for providing storage access to a user, the virtual center layer that hosts the backup application and provides computing resources for a plurality of virtual data centers accessible via the cloud service layer, and a storage layer providing storage resources for the plurality of virtual data centers;

wherein the virtual application is accessible via one of the virtual data centers of the cloud service layer; and wherein the backup application interfaces with a plurality of plug-in modules to provide backup functionality for the plurality of virtual machines of the virtual application, where each plug-in module performs an operation to place an application of any of the virtual machines in a state to accept the backup functionality, where the state of the application is specific to an application type;

accessing, using the backup application, a workflow that defines a plurality of actions for performing a backup functionality for each of the plurality of virtual machines of the virtual application, where each action of the plurality of actions corresponding to the backup functionality is performed by a corresponding plug-in module; and for each action of the plurality of actions identified from the workflow:
  (i) accessing a list of a plurality of plug-in modules by the backup application, each of the plurality of plug-in modules comprising a program associated with the backup application, the association being made before runtime of the backup application, and requiring an interface with the backup application to function and provide additional functionality to the backup application,
  (ii) selecting a plug-in module from the list that is designed to perform the action on a given virtual machine of the virtual application, and
  (iii) executing the selected plug-in module to perform that action on the given virtual machine, the selected plug-in module being executed by the backup application, wherein one of the plurality of plug-in modules performs one or more unique quiesce operations for placing an application in a state for enabling the backup functionality, the state varies from one application to another application; and wherein one of the plurality of plug-in modules performs one or more unique unquiesce operations after the quiesce operation that places the application to a state before the quiesce operation.

11. The non-transitory, machine-readable medium of claim 10, wherein the workflow defines a scheduling of each action relative to each other action in the plurality of actions.

12. The non-transitory, machine-readable medium of claim 11, wherein the instructions cause the machine to (ii) select the plug-in module and (iii) execute the selected plug-in module automatically in sequence for each action of the plurality of actions, the sequence being defined based on the scheduling defined in the workflow.

13. The non-transitory, machine-readable medium of claim 10, wherein the workflow is stored in the virtual center layer of the cloud computing system.

14. The method of claim 1, wherein the backup application queries the cloud service layer for obtaining identifier information for identifying the plurality of virtual machines of the virtual application.

15. The method of claim 14, wherein in response to a query from the backup application, the cloud service layer provides attributes associated with the virtual application, where the attributes include identifiers used by the virtual application to identify the plurality of virtual machines.

16. The processing system of claim 6, wherein in response to a query from the backup application, the cloud service layer provides attributes associated with the virtual application, where the attributes include identifiers used by the virtual application to identify the plurality of virtual machines.

17. The non-transitory, machine-readable medium of claim 10, wherein in response to a query from the backup application, the cloud service layer provides attributes associated with the virtual application, where the attributes include identifiers used by the virtual application to identify the plurality of virtual machines.

* * * * *